J. H. MATHER.
Sieve for Separating Oats from Wheat.
No. 51,334. Patented Dec. 5, 1865.
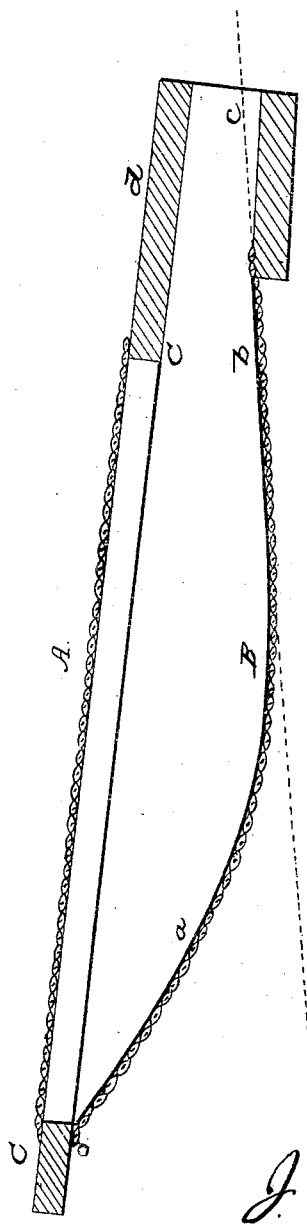
WITNESSES
E. J. Brown
S. Browne
INVENTOR
J. H. Mather
By his atty
J. S. Brown

UNITED STATES PATENT OFFICE.

JAMES H. MATHER, OF LAWRENCEVILLE, PENNSYLVANIA.

IMPROVEMENT IN SIEVES FOR SEPARATING OATS FROM WHEAT.

Specification forming part of Letters Patent No. 51,334, dated December 5, 1865.

*To all whom it may concern:*

Be it known that I, JAMES H. MATHER, of Lawrenceville, in the county of Tioga and State of Pennsylvania, have invented a new and Improved Sieve for Separating Oats from Wheat; and I do hereby declare that the following is a full and exact description thereof, reference being had to the accompanying drawings, making part of this specification, and representing a longitudinal vertical section through the sieve.

This is a compound sieve, composed of an upper plane sieve, A, and a lower concave sieve, B. The upper sieve, A, is attached to the upper surface of the frame C, which slides in the upper inclined groove of a wheat-fan, and therefore has the same slant. The lower sieve, B, starts at the upper edge, close up to the frame C; then by its concave form it first descends by a rapid slope in the portion $a$, and finally, at the lower edge, $b$, it is on a level, and the arrangement is required to be such that the lower portion, $b$, shall be level. This sieve terminates in a spout, $c$, to conduct away the oats. The upper sieve, A, does not extend quite so far downward and forward as the lower sieve, and a close board, $d$, extends downward the remaining distance.

Arranged in this manner, the operation of the combined sieves is as follows: The wheat and oats mixed first fall upon the upper edge of the upper sieve, A, from the hopper of the fan, and the wheat all passes through said sieve before reaching the lower edge, and is caught by the lower sieve, B, while most of the oats, on account of their greater length and lightness, pass over the sieve A, and finally down the inclined board $d$, and thus become separated from the wheat; but some grains of oats will pass through the sieve with the wheat. Then the lower sieve, being so much inclined at the upper portion, $b$, rapidly conveys it, before it can all pass through the sieve-meshes, to the lower level edge, $b$, where it lodges more or less closely to the spout $c$, the wind from the fan helping to convey the wheat and lift the grains of oats, so as to keep them at the surface, and finally the oats are conveyed away by the spout $c$, being accumulated close to it by the action of the sieve. Thus, by this combined construction and arrangement of the sieves, the desired object is obtained. The board $d$, extending up and back farther than the lower edge of the sieve B, prevents any of the wheat falling upon the spout $c$.

I do not claim a simple concave sieve otherwise arranged as above described; but

What I claim as my invention, and desire to secure by Letters Patent, is—

The combination and arrangement of the lower concave sieve, B, with the upper plane sieve, A, substantially as and for the purpose herein specified.

The above specification of my improved sieve for separating oats from wheat signed by me this 26th day of June, 1865.

JAMES H. MATHER.

Witnesses:
P. DAMAN,
JNO. C. SHUTTS.